US008977577B2

(12) United States Patent
Forte

(10) Patent No.: US 8,977,577 B2
(45) Date of Patent: Mar. 10, 2015

(54) METHODS, SYSTEMS, AND COMPUTER PROGRAM PRODUCTS FOR RECOMMENDING APPLICATIONS BASED ON USER INTERACTION PATTERNS

(75) Inventor: Andrea G. Forte, Brooklyn, NY (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 632 days.

(21) Appl. No.: 13/307,226

(22) Filed: Nov. 30, 2011

(65) Prior Publication Data

US 2013/0138585 A1 May 30, 2013

(51) Int. Cl.
*G06F 15/18* (2006.01)

(52) U.S. Cl.
USPC .................. 706/12; 705/14.66; 705/14.73

(58) Field of Classification Search
USPC .......................................................... 706/12
See application file for complete search history.

(56) References Cited

U.S. PATENT DOCUMENTS

| | | | | |
|---|---|---|---|---|
| 2006/0172267 | A1* | 8/2006 | Roell | 434/118 |
| 2010/0125026 | A1* | 5/2010 | Zavadsky et al. | 482/5 |
| 2010/0146437 | A1* | 6/2010 | Woodcock et al. | 715/806 |
| 2010/0277337 | A1* | 11/2010 | Brodersen et al. | 340/825.22 |
| 2011/0112996 | A1* | 5/2011 | Tu et al. | 706/12 |
| 2011/0210850 | A1* | 9/2011 | Tran | 340/540 |
| 2011/0251021 | A1* | 10/2011 | Zavadsky et al. | 482/5 |
| 2011/0295703 | A1* | 12/2011 | Flinn et al. | 705/14.73 |
| 2014/0052542 | A1* | 2/2014 | Zhang et al. | 705/14.66 |

OTHER PUBLICATIONS

Bo Yan and Guanling Chen. 2011. AppJoy: personalized mobile application discovery. In Proceedings of the 9th international conference on Mobile systems, applications, and services (MobiSys '11). ACM, New York, NY, USA, 113-126.*
Woerndl, Wolfgang; Schueller, C.; Wojtech, R., "A Hybrid Recommender System for Context-aware Recommendations of Mobile Applications," Data Engineering Workshop, 2007 IEEE 23rd International Conference on , vol., No., pp. 871,878, Apr. 17-20, 2007.*
N. Sahoo, P. V. Singh, and T. Mukhopadhyay, "A hidden Markov model for collaborative filtering," in Proc. Winter Conf. Business Intell., Salt Lake City, UT, Mar. 2011.*

* cited by examiner

*Primary Examiner* — Jeffrey A Gaffin
*Assistant Examiner* — David H Kim
(74) *Attorney, Agent, or Firm* — Cantor Colburn LLP

(57) ABSTRACT

A method for recommending an application includes obtaining an input model representing user interaction patterns during execution of a first application. The input model is compared to a reference model representing user interaction patterns during execution of a second application. A similarity is determined between the input model and the reference model. A recommendation of the second application is generated in response to the similarity.

18 Claims, 6 Drawing Sheets

| From\To | A2 | A3 | A4 | A5 |
|---|---|---|---|---|
| A2 | 0.2 (.1 sec) | 0.5 (.2 sec) | - | - |
| A3 | 0.2 (.3 sec) | 0.2 (.1 sec) | 0.4 (.1 sec) | - |
| A4 | - | 0.6 (.3 sec) | 0.1 (.1 sec) | 0.3 (.2 sec) |
| A5 | 0.5 (.2 sec) | - | 0.2 (.1 sec) | 0.3 (.2 sec) |

| From\To | A2 | A3 | A4 | A5 |
|---|---|---|---|---|
| A2 | 0.2 (.1 sec) | 0.5 (.2 sec) | - | - |
| A3 | 0.2 (.3 sec) | 0.2 (.1 sec) | 0.4 (.1 sec) | - |
| A4 | - | 0.6 (.3 sec) | 0.1 (.1 sec) | 0.3 (.2 sec) |
| A5 | 0.5 (.2 sec) | - | 0.2 (.1 sec) | 0.3 (.2 sec) |

600

| | A3 | A4 | A5 |
|---|---|---|---|
| A3 | 0.3 (.2 sec) | 0.34 (.2 sec) | - |
| A4 | 0.4 (.1 sec) | 0.2 (.1 sec) | 0.4 (.1 sec) |
| A5 | - | 0.1 (.2 sec) | 0.3 (.1 sec) |

METHODS, SYSTEMS, AND COMPUTER PROGRAM PRODUCTS FOR RECOMMENDING APPLICATIONS BASED ON USER INTERACTION PATTERNS

BACKGROUND

1. Field of the Invention

Exemplary embodiments relate generally to recommending applications to a user of a device, and more particularly to recommending applications to a user of a device in response to user interaction patterns with existing applications.

2. Description of Background

Providers of goods and services often recommend products to consumers in hopes of the consumer purchasing the recommended products. For example, online retailers of books and movies often suggest recommended books and movies based on prior purchases. These recommendations are typically based on the genre of the book or movie, the author, actors, etc. Similarly, video game providers will often recommend video games based on certain classifications, such as racing, shooter, role playing games, etc. Online retailers may also track user interaction with a website to generate recommendations. Such recommendations, if properly developed, can increase revenue via increased sales.

BRIEF SUMMARY

Exemplary embodiments include a method for recommending an application including obtaining an input model representing user interaction patterns during execution of a first application; comparing the input model to a reference model, the reference model representing user interaction patterns during execution of a second application; determining a similarity between the input model and the reference model; and generating a recommendation of the second application in response to the similarity.

Other exemplary embodiments include a system for recommending an application, the system including a server in communication with a user device via a network; a database storing a reference model; the server executing a recommendation engine, the recommendation engine performing a process comprising: obtaining an input model representing user interaction patterns during execution of a first application; comparing the input model to a reference model, the reference model representing user interaction patterns during execution of a second application; determining a similarity between the input model and the reference model; and generating a recommendation of the second application in response to the similarity.

Other exemplary embodiments include a computer program embodied on a non-transitory computer-readable storage medium, the computer program including instructions for causing a processor to implement a process for recommending an application, the process comprising: obtaining an input model representing user interaction patterns during execution of a first application; comparing the input model to a reference model, the reference model representing user interaction patterns during execution of a second application; determining a similarity between the input model and the reference model; and generating a recommendation of the second application in response to the similarity Other systems, methods, and/or computer program products according to embodiments will be or become apparent to one with skill in the art upon review of the following drawings and detailed description. It is intended that all such additional systems, methods, and/or computer program products be included within this description, be within the scope of the exemplary embodiments, and be protected by the accompanying claims.

BRIEF DESCRIPTION OF DRAWINGS

Referring now to the drawings wherein like elements are numbered alike in the several FIGURES:

FIG. 6 illustrates an exemplary input model; and

FIG. 7 illustrates an exemplary comparison of an input model to a reference model.

The detailed description explains the exemplary embodiments, together with advantages and features, by way of example with reference to the drawings.

DETAILED DESCRIPTION OF EXEMPLARY EMBODIMENTS

One or more exemplary embodiments of the invention are described below in detail. The disclosed embodiments are intended to be illustrative only since numerous modifications and variations therein will be apparent to those of ordinary skill in the art.

Figure 1:
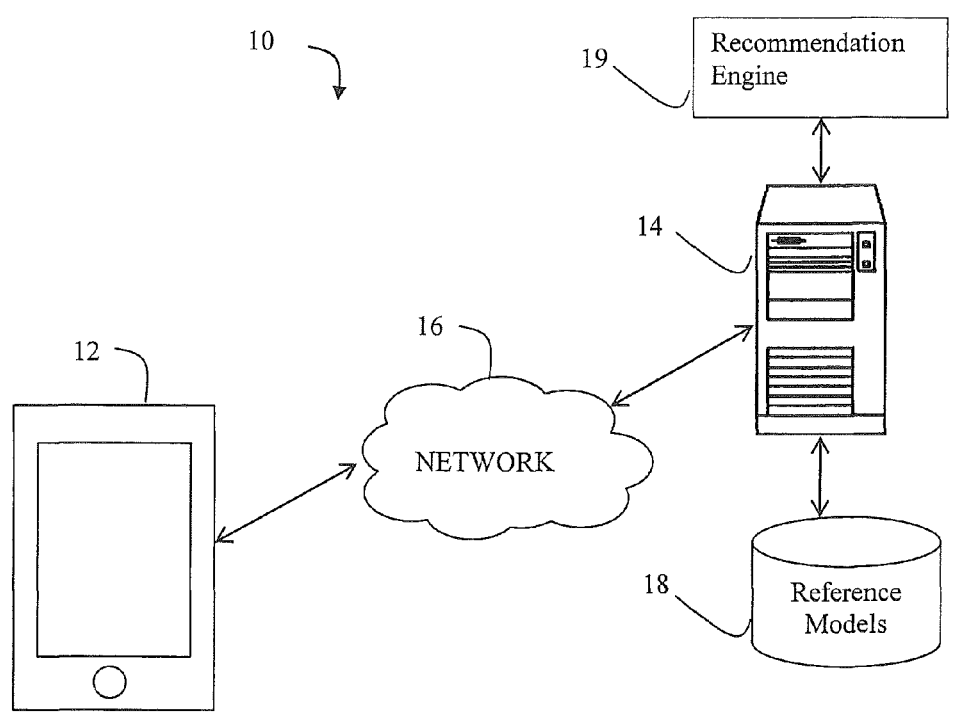
FIG. 1 illustrates a system for recommending applications in exemplary embodiments.

FIG. 1 illustrates an exemplary system 10 for recommending a software application, referred to herein as an application. System 10 includes a device 12 that communicates with a server 14 over network 16. Server 14 executes a recommendation engine 19 that recommends applications based on user input models derived from user interaction patterns with the device 12. Server 14 access a database 18 of reference models to determine recommended applications for device 12. As described in further detail herein, server 14 compares user input models derived from user interaction patterns from device 12 to reference models in database 18 to determine what applications should be recommended for device 12.

Figure 2:
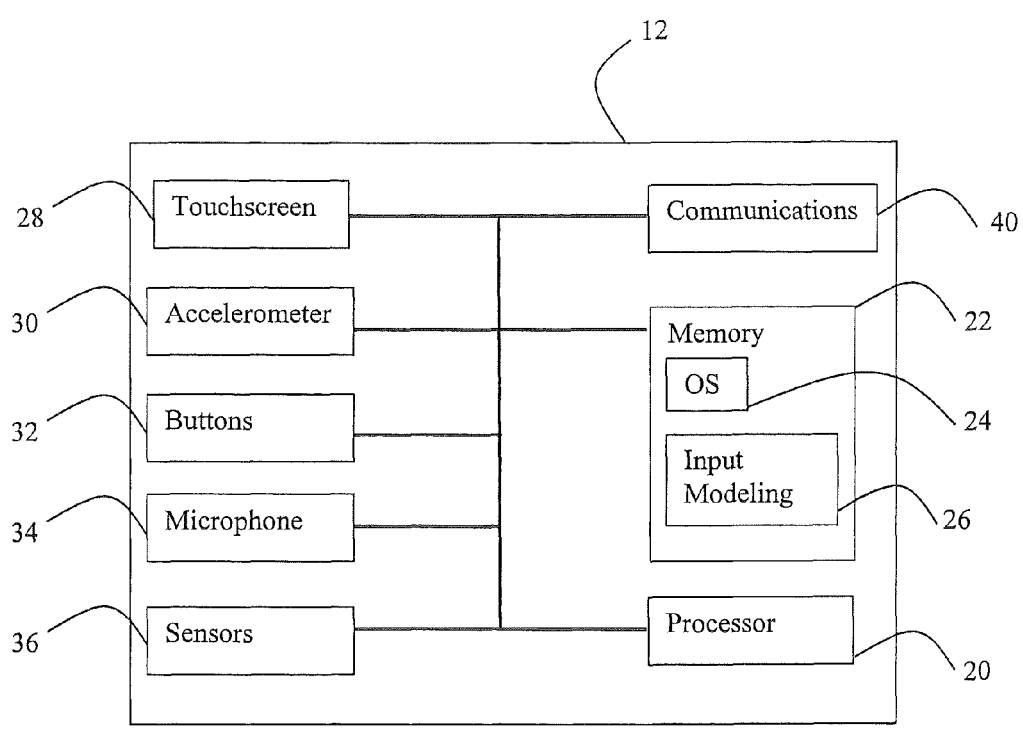
FIG. 2 illustrates an exemplary mobile device.

Device 12 may be a stationary device (e.g., a desktop computer) or a mobile device (e.g., mobile phone, tablet, laptop, media player, personal digital assistant). FIG. 2 illustrates an exemplary device 12, which is a mobile device. Device 12 includes a processor 20, which may be a general-purpose microprocessor executing software code stored in a storage medium to perform the functions described herein. A memory 22 stores applications that are executed by processor 20, such as an operating system 24 and an input modeling application 26.

Device 12 includes a number of input devices including a touchscreen 28, accelerometer 30, buttons 32, microphone 34 and sensors 36. Touchscreen 28 may be a capacitive-type touchscreen, such as that used in the iPad™ device. Touchscreen 28 allows a variety of user inputs including tap (e.g., touching the screen in a single location and rapidly ceasing contact), double tap, slide (e.g., touching the screen, moving in an x and/or y direction, then ceasing contact), hold (e.g., touching the screen and maintaining contact for more than a predetermined time), drag (e.g., touching an object an moving that object on the screen), release (e.g., ceasing contact with the screen). Although the term "touch" is used herein, it is understood that the touchscreen 28 may be used with a stylus or other device instead of a finger. Touchscreen 28 may also receive concurrent actions, such as contacting the touchscreen 28 at multiple locations at the same time. Touchscreen 28 also detects the location of contact, and any direction associated with the input. Touch events may also be detected by other surfaces of device 12 in addition to touchscreen 28, such as a backside of device 12.

Accelerometer 30 detects motion of the device 12 in three dimensions and can detect inputs such as tilting, vibration, left-to-right movement, up-and-down movement, etc. Gaming applications often use input from the accelerometer 30. Buttons 32 detect input at a predetermined location on the device 12. Buttons 32 differ from touchscreen 28, as button location is typically fixed on device 12. Touchscreen 28 may also present button-like input locations, but these input locations are not fixed relative to device 12. Microphone 34 detects audio inputs such as verbal inputs (e.g., spoken commands), music, clapping, etc. Sensors 36 may include a variety of sensors such as a light sensor, proximity sensor, camera, etc.

Communications module 40 supports a variety of different types of communication protocols. Communication module 40 may include a port for a wired connection (e.g., Ethernet port) to network 16. Communications module 40 may also support wireless cellular communications such as 3G or 4G-LTE cellular connections. Communications module 40 also supports shorter range communications protocols such as 802.11x (e.g., Wi-Fi), Bluetooth, near field communication (NFC), etc. Communications module 40 may also support services such as global position systems (GPS).

Referring to FIG. 1, network 16 may be any communications network capable of supporting communications between the device 12 and the server 14. The network 16 may be wired, wireless, optical, radio, packet switched, circuit switched, or any combination thereof. The network 16 may use any topology, and links of the network 16 may support any networking technology, protocol, or bandwidth such as Ethernet, DSL, cable modem, ATM, SONET, MPLS, PSTN, POTS modem, PONS, HFC, satellite, ISDN, WiFi, WiMax, mobile cellular, any combination thereof, or any other data interconnection or networking mechanism. The network 16 may be an intranet, an internet, the Internet, the World Wide Web, a LAN, a WAN, a MAN, or any other network for interconnection of computers systems.

Server 14 includes a general-purpose microprocessor executing software code stored in a storage medium to perform the functions described herein. Server 14 communicates with device 12 over network 16 to receive user interaction patterns or input models from device 12. Server 16 executes a recommendation engine 19 that compares input models to reference models in database 18 in order to generate recommendations of applications for device 12. Database 18 is implemented using a memory device and may be internal to server 14 or remotely located from server 14.

Figure 3A:
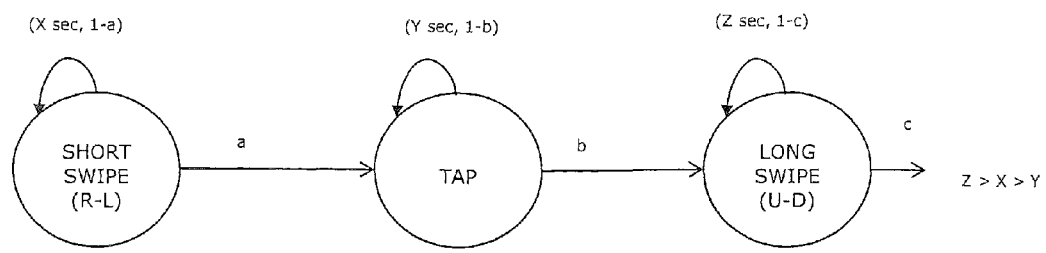
FIGS. 3A and 3B illustrate exemplary user input states.

Embodiments compare user interaction input patterns for a first application to user interaction input patterns for a reference application to determine whether to suggest a reference application to a user. FIG. 3A depicts an exemplary input pattern which includes input states of a short swipe along a right-left axis, followed by a tap, followed by a long swipe along an up-down axis. Transition probabilities between the input states are represented by probabilities, a, b and c. Transition times between the input states are represented by values X, Y, and Z, where Z>X>Y. The input pattern of FIG. 3A is suggestive of a news reading application, where a user thumbs through articles, selects and article, and then scrolls through the article.

Figure 3B:
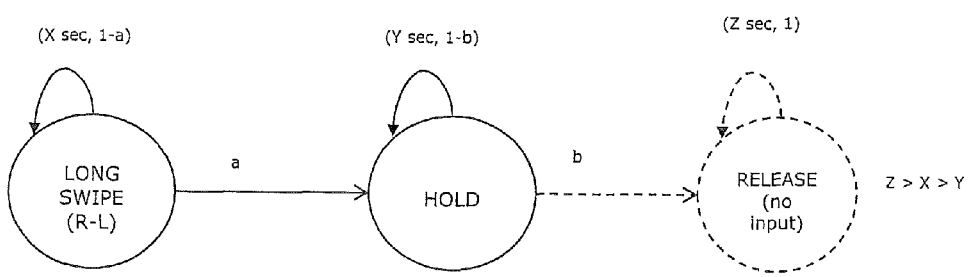

FIG. 3B depicts an exemplary input pattern which includes input states of a long swipe along a right-left axis, followed by a hold, followed by a release. Transition probabilities between input states are represented by probabilities, a and b. Transition times between the input states are represented by values X, Y, and Z, where Z>X>Y. The input pattern of FIG. 3B is suggestive of a gaming application.

Figure 4:
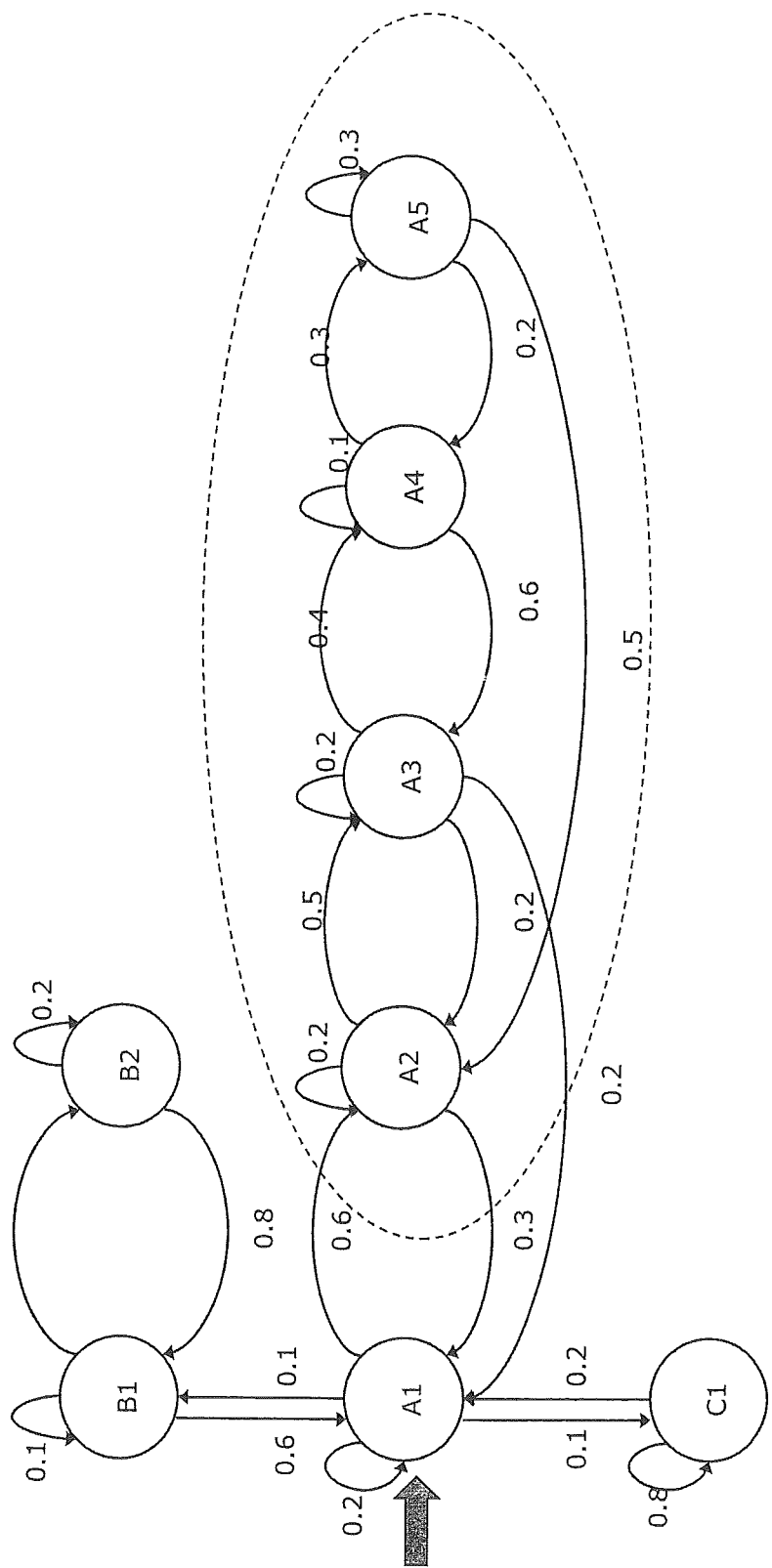
FIG. 4 illustrates transitions between different user input states for an exemplary application.

FIG. 4 illustrates transitions between user input states for an exemplary application. As an application is executed on device 12, input modeling application 26 monitors transitions between input states and derives transition probabilities between input states. Input states (A1, B1, etc.) in FIG. 4 represent types of input states, such as a tap, swipe, button press, tilt, etc. For example, as shown in FIG. 4, the application begins with input state A1, which may correspond to a tap on an initial menu screen. As the user interacts with the application, the transition probabilities between each input state are recorded. As shown in FIG. 4, user input transitions from input state A1 to input state A2 with a 0.6 probability. In other words, 6 out of 10 times, input state A1 is followed by input state A2. Additionally, input modeling application 26 captures the transition time (e.g., in seconds or milliseconds) taken for each input state transition. The input state types, transition probabilities and transition times are used by the recommendation engine 19 to recommend other applications, as described in further detail herein.

Figure 5:
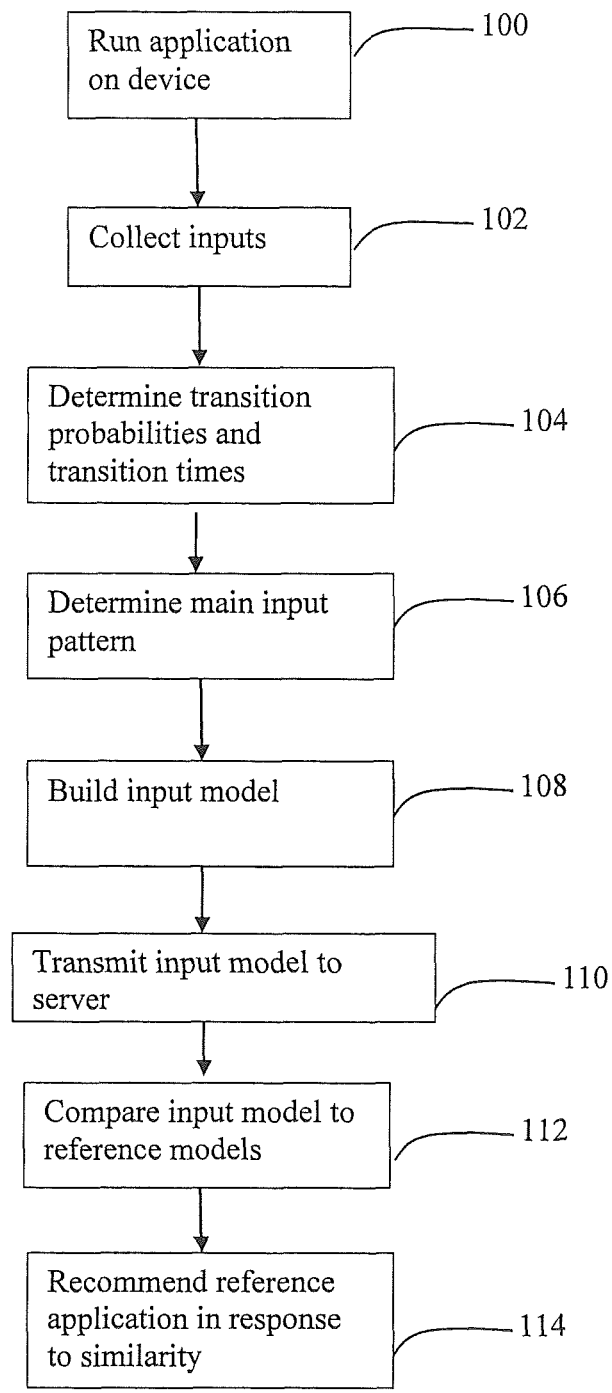
FIG. 5 is a flowchart of a process for recommending applications in exemplary embodiments.

FIG. 5 is a flowchart of a process for creating an input model representing user interaction patterns with the various inputs on the device 12 while using an application. An input model is generated for each application. As described in further detail herein, the input model is compared to reference models to locate other applications that may be of interest to the user of device 12. The process begins at 100 when a user runs an application on device 12. While the application is running on device 12 and the user is interacting with the application through device inputs, the input modeling application 26 collects the user inputs at 102 and determines the input state types (e.g., tap, swipe, tilt). The input modeling application 26 may be launched whenever and application is executed on device. Device 12 may prompt the user for permission to execute the input modeling application, for the purpose of recommending other applications.

At 104, the input modeling application 26 detects the transition probabilities for the various input states, as shown in the example in FIG. 4. The input modeling application 26 also captures transition times between the input states. The input modeling application 26 may build the transition probabilities and transition times as the application is running, or wait until execution of the application is ceased.

At 106, the input modeling application determines a main input pattern based on the transition probabilities. The main input pattern corresponds to the primary input pattern entered by the user during execution of the application. In the example of FIG. 4, the main input pattern corresponds to input states A2-A3-A4-A5. Determining the main input pattern is performed by analyzing the transition probabilities between input states and detecting a group of input states which are most probable. This may be done by adding the transition probabilities or locating transition probabilities that are dominant, i.e., exceed other local transition probabilities. As shown in FIG. 4, the transition probabilities between input states A2-A3-A4-A5 indicate that the bulk of the user interaction with the application occurs within these states, once leaving initial state A1.

Once the application is terminated, or concurrently with execution of the application, the input modeling application 26 builds an input model at 108. The input model is a representation of the input state types, transition probabilities and, optionally, the transition times, for the input states making up the main input pattern. FIG. 6 illustrates an exemplary input model for the application depicted in FIG. 4. The input model of FIG. 6 is in tabular form, but may be represented in other forms, such as a distribution probability. The input model identifies the input state types of the main input pattern. Each input state is coded to identify the type of input state involved. For example, input states A1 and A5 may be coded to identify tap inputs, input state A3 may represent a swipe along the left-right axis, and input state A4 may represent a swipe along the up-down axis. The input states may further be coded to represent duration of the input state, such as a long swipe, short swipe, etc. The duration may be an average duration across multiple inputs of the same type.

The input model includes an array of the transition probabilities from each state, and optionally, transition times between states. It is noted that a state may transition onto itself. For example, input state A1 transitions upon itself with a probability of 0.2. As used herein, a transition between input states includes repeating the same input state or transitioning to another input state. The input model includes bi-directional transitions, such as from A3 to A2 (0.2 probability) and from A2 to A3 (0.5 probability).

Referring back to FIG. 5, once the input model is created at 108, the input model is transmitted to server 14 at 110 for analysis by recommendation engine 19. Alternatively, the raw input data from device 12 may be transmitted to server 14. The raw input data would include the input types and input durations, but not the transition probabilities or transition times. Server 14 executes the input modeling application to convert the raw input data into the input model. As the input model is smaller than the input data, network bandwidth is conserved by generating the input model at device 12, and transmitting the input model from device 12 to server 14.

At 112, the recommendation engine 19 executing on server 14 compares the input model to reference models in database 18. As noted above, the input model may be generated at device 12 and transmitted to server 14. This transmission may be conditioned on the user giving permission to transmit the input model. Alternatively, server 14 receives raw input data from device 12, and executes the input modeling application 26 at server 14 to generate the input model.

At 112 the input model for the application on device 12 is compared to reference models in database 18. The reference models in database 18 have the same format as the input model. The reference models in database 18 may be derived from user interaction patterns obtained from a wide population of users using reference applications, where each reference model corresponds to a reference application. The reference applications are other applications that may be recommended to a user of device 12. In this scenario, users would agree to submit their input models to server 14 for generation of the reference models. Users may also be provided with an incentive for sharing their input model in this fashion, the incentive in the form of free applications, discounts on applications, free updates, etc. Additionally, the reference models may be generated by the application producer based on beta-testing, human factors testing, etc. Additionally, reference models may be generated through emulators that allow a user to emulate use of an application remotely, over a network, without using device 12. For example, a user of a personal computer could access an emulator via a network, and experience interaction with an application as if running on device 12. The input model corresponds to a first application executing at device 12 and the reference model corresponds to a second application, for which a reference model has been generated and stored in database 18.

The comparison of the input model to a reference model at 112 involves determining a similarity between the input state patterns in the main input pattern and a similarity in the distribution of transition probabilities. The degree of similarity in the input state patterns may be determined by comparing sequences of input states in the input model and reference model to detect similar patterns of input states. Further, the duration of an input state may be used to identify whether two input states may be considered a match (e.g., a long swipe and short swipe may not be considered equivalent). In other embodiments, the duration of an input state is reflected in the coding of the input state type. That is, a short swipe and long swipe have different input state types to reflect the duration of the input state, eliminating the need for a separate duration value.

If the input model and reference model share a sufficient similarity in input state patterns, a similarity in the distribution of transition probabilities is determined. The similarity in the distribution of transition probabilities may be determined by matching the array of transition probabilities for the input model to the array of transition probabilities for the reference model. This may be performed by computing a sum of the differences between the transition probabilities of the two arrays. Similarly, a similarity in the distribution of transition times is determined. This may be performed by computing a sum of the differences between the transition times of the two arrays.

FIG. 7 illustrates comparison of input model 500 to reference model 600. As shown in FIG. 7, reference model 600 shares common input state patterns with a portion of input model 500. It is noted that determining similarity between the input model and the reference model may be based on the entire input model and entire reference model, or a subset of the input model and a subset of the reference model, and combinations thereof. FIG. 7 depicts a subset of the input model 500 being similar to the entire reference model 600. Differences between the transition probabilities in the input model and reference model are determined to indicate similarity. Also, differences between the transition times in the input model and reference model are determined to indicate similarity.

Based on the similarity of the input state patterns, the transition probabilities and the transition times, the recommendation engine 19 recommends one or more reference applications at 114. The recommendation engine 19 recommends the application corresponding to the reference model by initiating transmission of a message to the device 12, notifying device 12 of the recommended application. The message may include options for downloading the recommended application to device 12 for installation.

As described above, the exemplary embodiments determine a degree of similarity between user interaction patterns for a first application executing on a user device and user interaction patterns for a second application represented by a reference model in a database. Exemplary embodiments may be implemented in the form of computer-implemented processes and devices for practicing those processes. The exemplary embodiments can also be in the form of computer program code containing instructions embodied in tangible media, such as floppy diskettes, CD ROMs, hard drives, or any other computer-readable storage medium, or transmitted over some transmission medium, wherein, when the computer program code is loaded into and executed by a computer, the computer becomes a device for practicing the exemplary embodiments. When implemented on a general-purpose microprocessor, the computer program code segments configure the microprocessor to create specific logic circuits.

While the invention has been described with reference to exemplary embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiments disclosed for carrying out this invention, but that the invention will include all embodiments falling within the scope of the claims. Moreover, the use of the terms first, second, etc., do not denote any order or importance, but rather the terms first, second, etc., are used to distinguish one element from another. Furthermore, the use of the terms a, an, etc., do not denote a limitation of quantity, but rather denote the presence of at least one of the referenced item.

What is claimed:

1. A method for recommending an application, the method comprising:
    obtaining an input model representing user interaction patterns during execution of a first application, wherein the input model includes a plurality of input states, each input state of the input model encoded to identify an input state type, each input state type corresponding to a different user physical interaction with a remote device executing the first application;
    comparing the input model to a reference model, the reference model representing user interaction patterns during execution of a second application, wherein the reference model includes a plurality of input states, each input state of the reference model encoded to identify an input state type of the reference model, each input state type of the reference model corresponding to a different user physical interaction with a device executing the second application;
    determining a similarity between the input model and the reference model comprising determining a similarity between input state types of the input model to input state types of the reference model; and
    generating a recommendation of the second application in response to the similarity.

2. The method of claim 1 wherein:
    each input state of the input model is encoded to identify an input state duration of the input model.

3. The method of claim 2 wherein:
    each input state of the reference model is encoded to identify an input state duration of the reference model;
    wherein determining a similarity between the input model and the reference model includes determining a similarity between input state durations of the input model to input state durations of the reference model.

4. The method of claim 1 wherein:
    the input model includes transition probabilities between the input states of the input model.

5. The method of claim 4 wherein:
    the reference model includes transition probabilities between the input states of the reference model;
    wherein determining a similarity between the input model and the reference model includes determining a similarity between transition probabilities of the input model to transition probabilities of the reference model.

6. The method of claim 5 wherein:
    determining a similarity between transition probabilities of the input model to transition probabilities of the reference model includes determining a sum of differences between the transition probabilities of the input model to transition probabilities of the reference model.

7. The method of claim 1 wherein:
    the input model includes transition times between the input states of the input model.

8. The method of claim 7 wherein:
    the reference model includes transition times between the input states of the reference model;
    wherein determining a similarity between the input model and the reference model includes determining a similarity between transition times of the input model to transition times of the reference model.

9. The method of claim 8 wherein:
    determining a similarity between transition times of the input model to transition probabilities of the reference model includes determining differences between the transition times of the input model and transition times of the reference model.

10. The method of claim 1 wherein:
    obtaining the input model includes:
    obtaining the input states;
    obtaining transition probabilities between the input states;
    determining a main input pattern including a plurality of the input states in response to the transition probabilities; and
    building the input model based on the main input pattern.

11. The method of claim 1 wherein:
    obtaining the input model includes receiving the input model from the remote device executing the first application.

12. The method of claim 11 wherein:
    obtaining the input model from the remote device includes providing an incentive to the remote device for submitting the input model.

13. The method of claim 1 wherein:
    the user interaction patterns during execution of the first application include user touching the remote device.

14. The method of claim 13 wherein:
    the user interaction patterns include taps.

15. The method of claim 13 wherein:
    the user interaction patterns include slides.

16. The method of claim 13 wherein:
    the user interaction patterns with the device include tilting the device.

17. An apparatus comprising:
    a memory comprising computer-executable instructions for recommending an application; and
    a processor executing the computer-executable instructions, the computer-executable instructions, when executed by the processor, cause the processor to perform operations comprising:
    obtaining an input model representing user interaction patterns during execution of a first application, wherein the input model includes a plurality of input states, each input state of the input model encoded to identify an input state type, each input state type corresponding to a different user physical interaction with a remote device executing the first application;
    comparing the input model to a reference model, the reference model representing user interaction patterns during execution of a second application, wherein the reference model includes a plurality of input states, each input state of the reference model encoded to identify an input state type of the reference model, each input state type of the reference model corresponding to a different user physical interaction with a device executing the second application;

determining a similarity between the input model and the reference model comprising determining a similarity between input state types of the input model to input state types of the reference model; and generating a recommendation of the second application in response to the similarity.

18. A computer program product embodied on a non-transitory computer-readable storage medium, for recommending an application, the computer program including instructions that, when executed by a computer, cause the computer to perform operations comprising:

obtaining an input model representing user interaction patterns during execution of a first application, wherein the input model includes a plurality of input states, each input state of the input model encoded to identify an input state type, each input state type corresponding to a different user physical interaction with a remote device executing the first application;

comparing the input model to a reference model, the reference model representing user interaction patterns during execution of a second application, wherein the reference model includes a plurality of input states, each input state of the reference model encoded to identify an input state type of the reference model, each input state type of the reference model corresponding to a different user physical interaction with a device executing the second application;

determining a similarity between the input model and the reference model comprising determining a similarity between input state types of the input model to input state types of the reference model; and generating a recommendation of the second application in response to the similarity.

\* \* \* \* \*